US008432943B2

(12) United States Patent
Ullman et al.

(10) Patent No.: US 8,432,943 B2
(45) Date of Patent: Apr. 30, 2013

(54) MONOLITHIC FIBER LASER BEAM COMBINER

(75) Inventors: Alan Z. Ullman, Northridge, CA (US); Dennis G. Harris, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 1496 days.

(21) Appl. No.: 11/677,904

(22) Filed: Feb. 22, 2007

(65) Prior Publication Data
US 2011/0182308 A1 Jul. 28, 2011

(51) Int. Cl.
*H01S 3/30* (2006.01)
(52) U.S. Cl.
USPC ........ 372/6; 372/35; 372/69; 372/70; 372/71; 372/77; 372/92; 372/94; 385/32; 385/127
(58) Field of Classification Search ............ 372/35, 372/6, 69, 70, 72, 91–94; 385/32, 127, 70, 385/701
See application file for complete search history.

(56) References Cited

U.S. PATENT DOCUMENTS

| 4,050,036 A | 9/1977 | Chambers et al. |
| 4,598,408 A | 7/1986 | O'Keefe |
| 4,606,036 A | 8/1986 | Holmes |
| 4,722,591 A | 2/1988 | Haffner |
| 4,744,090 A | 5/1988 | Freiberg |
| 4,813,762 A | 3/1989 | Leger et al. |
| 5,033,060 A | 7/1991 | Leger et al. |
| 5,299,222 A | 3/1994 | Shannon et al. |
| 5,444,213 A | 8/1995 | Honda et al. |
| 5,923,694 A * | 7/1999 | Culver ............................. 372/69 |
| 5,943,358 A | 8/1999 | Allik et al. |
| 5,946,130 A | 8/1999 | Rice |
| 6,005,717 A | 12/1999 | Neuberger et al. |
| 6,052,392 A * | 4/2000 | Ueda et al. ........................ 372/6 |
| 6,259,560 B1 | 7/2001 | Scheps |
| 6,266,359 B1 | 7/2001 | Taheri et al. |
| 6,282,225 B1 | 8/2001 | Bullock et al. |
| 6,459,068 B1 * | 10/2002 | Yamaura et al. ........... 219/121.6 |
| 6,584,134 B2 * | 6/2003 | Yin et al. ......................... 372/92 |
| 7,522,651 B2 * | 4/2009 | Luo et al. ......................... 372/75 |
| 2002/0037134 A1 * | 3/2002 | Akamatsu et al. .............. 385/32 |
| 2003/0058914 A1 * | 3/2003 | Haas et al. ...................... 372/70 |
| 2006/0002434 A1 * | 1/2006 | Nakano et al. .................... 372/6 |
| 2006/0263024 A1 * | 11/2006 | Dong et al. .................... 385/125 |

FOREIGN PATENT DOCUMENTS

| JP | 11 026847 | 1/1999 |
| WO | WO 01/08275 | 2/2001 |
| WO | WO 2006/045111 | 4/2006 |

* cited by examiner

*Primary Examiner* — Tod T Van Roy
*Assistant Examiner* — Delma R Forde
(74) *Attorney, Agent, or Firm* — Haynes and Boone, LLP

(57) ABSTRACT

A compact, light weight laser beam combiner includes a pair of concentric annular shells defining an annular cavity of an annular ring resonator having an annular solid laser gain medium disposed therein. The output ends of a plurality of low power and brightness fiber lasers are coupled into the cavity of the resonator such that fiber laser beams cause the gain medium in the resonator cavity to lase and produce an annular beam of laser light. Optical elements of the resonator are operable to feed a first portion of the laser light back through the resonator cavity to support regenerative lasing of the laser medium and to couple off a second portion of the laser light in the form of a circular beam of high power and high brightness laser light. A fluid may be circulated through the resonator cavity to cool the laser medium.

24 Claims, 4 Drawing Sheets

MONOLITHIC FIBER LASER BEAM COMBINER

BACKGROUND

This disclosure relates to lasers, in general, and in particular, to high power, high brightness, monolithic fiber laser beam combiners that are suitable for laser weapons applications, including airborne tactical laser weapons systems.

Light, robust, high performance solid state laser weapons are desired for a broad range of military applications. None of the approaches currently being pursued, including slab lasers of various geometries and fiber lasers, is making progress rapidly enough to support near-term military applications.

One approach currently under development utilizes "slab lasers" of an appropriate solid material, such as Yttrium Aluminum Garnet (YAG), doped with an appropriate element which can support lasing. These dopants may include lanthanide elements, such as neodymium-(Nd), ytterbium-(Yb), erbium (Er) or thulium (Tm) or other elements. These "SSL" laser combiners utilize multiple slabs of doped YAG illuminated by laser diodes operating at an appropriate wavelength based on the adsorption characteristics of the doped slabs. These slabs are then located in a resonator cavity, in which a laser beam is generated. Depending on the configuration of the laser, multiple slabs may be used, and a combined laser beam produced thereby. The multiple beams are combined in such a way that the individual beams are in phase with each other. This causes them to act as if they were a single laser beam. The beam or beams produced must be of near-perfect beam quality so as to produce a maximum intensity on the target to which they will be propagated. The technology currently being pursued in slab lasers has been demonstrated beyond the 10 kW level and is expected to enable single or phased beams to be generated to the 100 kW level.

However, both Yb- and Nd-doped lasers operate at a wavelength close to 1 micron, a region in which the eye is extremely sensitive to retinal damage. This may limit their utility in areas in close proximity to people. While means exist for achieving operation in an "eye-safe" regime, these approaches typically produce lasers with much lower efficiencies and have not been demonstrated at high power.

Additionally, slab lasers have another drawback relating to their need for extensive cooling of the doped YAG slabs. Failure to cool adequately leads to rapid material failure due to the brittle nature of this material. Even before that point is reached, however, the material will thermally distort the beam to an unacceptable extent if the beam is to be propagated to a distant target. Such considerations therefore do not apply, for example, to SSLs used for welding applications, in which the beam is propagated over relatively small distances (e.g., a few inches or feet) but are important for laser weapon applications in which propagation distances are relatively long (e.g., miles.) The need for cooling makes it essential that the slabs used be very thin, which in turn, complicates both adsorption of the laser diode light and the extraction of the laser beam.

Thus, slab lasers are typically large and heavy compared to the kinds of platforms desired for laser weapons. This is in large part due to their low electrical-to-laser beam conversion efficiency, which requires that large numbers of laser diodes be used to pump the laser and that large cooling systems be provided to take away the heat. Supplying this power requires large power sources (e.g., batteries), and the thermal management capabilities required to support operations are also large and heavy, and accordingly, are not optimum for airborne weapons platforms, where weight is at a premium. Their low efficiency also limits the ability to scale the lasers because the cooling problems become more severe as the size and power of the hardware increase.

In another general approach, systems that combine the outputs of a number of "fiber lasers" have been developed for various applications, including laser welding. Fiber lasers continue to improve in power output, and provide another possible route to achieving light weight laser weapons. Because of their geometry, fiber lasers are typically capable of achieving much higher efficiencies of conversion of electricity into laser light. Further, their geometry typically enables better cooling than in slab lasers. Accordingly, a broad range of optical techniques are currently being pursued for fiber laser beam combining.

However, these approaches are also encountering some difficulties. Many of the more promising approaches from a technical standpoint require extraordinarily complex optical systems, which may not be acceptable for weapons applications. Additionally, fiber lasers have not yet been developed that have outputs beyond the kW-scale for beams with high brightness, although low-brightness fiber lasers have produced beams beyond the 10 kW-scale.

As those of skill in the art will appreciate, in addition to achieving high power in the combined laser beam, laser weapons require a combined beam that also has a high "brightness." In this context, brightness refers to the power per unit area per unit solid angle subtended by the beam. Thus, to achieve a high brightness, the individual beams must be mutually coherent and combined in such a way as to produce a single-lobed far-field pattern with negligible side lobes.

Where high brightness is required, as it is for laser weapons, methods are needed to combine large numbers of fiber lasers into what are effectively single, high-brightness beams. Various techniques are currently being pursued in an effort to do so. One such approach utilizes a reference fiber laser as a standard, and then modulates each additional fiber laser that is slaved to the reference in a way that permits detection and correction of any phase errors. Each slave beam to be combined must be modulated at a distinct frequency and its phase error detected. This creates a system that is both electronically and optically complex. As with all of these approaches, achieving a combined beam of high brightness requires that each individual fiber laser beam has excellent beam quality. This imposes limitations on the optical configuration and penalizes overall system efficiency.

In a related approach, the multiple fiber laser beams are optically phase-matched through electronic feedback means that enable continuous adjustment of phase. This approach becomes extremely complex for phasing of a large number of beams. As in virtually all approaches being pursued, this technique relies on the fiber laser beams being individually of high brightness. This requirement generally limits the efficiency of the fiber lasers. In addition to that effect, there are also significant losses in efficiency that are encountered due to imperfections in the phasing of the beams to each other.

In another approach, multiple fiber laser beams having slightly different wavelengths can be combined by the use of a diffraction grating. The alignment of these beams into a single combined beam must be carefully controlled such that the beams do not effectively separate over the long propagation distance to the target characteristic of laser weapons. This typically requires coalignment to ~1 microradian, which is a very difficult standard to achieve in practice.

Yet another approach to fiber laser beam combining relies on a property of waveguides to achieve phasing of the beams. However, as will be appreciated, where 100 or more individual fiber laser beams must be combined, the mechanical tolerances are extremely tight and the complexity can become impractically high.

As a practical matter, fiber lasers generally are not currently scalable beyond the 1-10 kW range. Typically, high brightness can be achieved only at the low end of this range, while "welding lasers" can be scaled more effectively to the higher end. Typically, the geometry of fiber lasers can produce higher efficiency than slab lasers, because the long fiber can more efficiently adsorb the laser diode pump light. However, this higher efficiency is significantly degraded when "single mode" operation is required to provide a high-brightness source that can be optically combined into a high-power, high-brightness laser.

Beam combining is required to achieve laser weapon power levels. This requires the optical combining of dozens or perhaps hundreds of individual fibers into a single high-brightness projected beam. This increases the optical complexity of the system substantially, and is potentially a major source of reduced efficiency and beam brightness. Thus, the technology needed to combine multiple fiber lasers into a single, high-brightness beam remains elusive, with none of the approaches currently being pursued assured of achieving the performance and robustness needed for practical laser weapons. The approaches being pursued all have limitations in terms of being able to phase the beams and of achieving a high brightness in the combined output beam.

Thus, there is a long-felt but as yet unsatisfied need for a technology that is practical for the implementation of a high power, high brightness laser weapon system that is light in weight and compact enough to be carried aboard an aircraft.

BRIEF SUMMARY

In accordance with the exemplary embodiments thereof described herein, a compact, light weight and efficient laser beam combiner is provided that is capable of producing high power and brightness laser systems, including laser weapons systems.

In one exemplary embodiment, a laser beam combiner comprises a pair of concentric annular shells defining an annular cavity having a long axis, reflective or refractive annular interior wall surfaces, and reflective and/or refractive elements disposed at opposite ends thereof so as to define an annular ring resonator. An annular solid laser gain medium is disposed in the annular cavity of the resonator, and the output ends of a plurality of fiber lasers are coupled into the cavity of the resonator such that the laser light beams from the fiber lasers are directed into the gain medium. Through the appropriate choice of wavelength of the fiber lasers and composition of the laser gain medium, the fiber laser beams are adsorbed readily, resulting in the excitation of the dopant into a first excited state. Through energy transfer processes in the laser gain medium, this first excited state produces a population inversion in a second excited state which may sustain lasing and produce an axially directed annular beam of laser light. The wavelength of the fiber lasers is selected through the choice of lasing medium as well as through external means including Raman shift. It is desirable for the energy difference between the first and second excited states in the gain medium be relatively small, such that little heat is left behind in the gain medium. This minimizes or potentially eliminates the need for cooling of the gain medium and permits the laser to be operated at a high power level without unacceptable distortion of the laser beam and loss of brightness due to the optical properties of the gain medium.

At least one of the reflective elements of the resonator is operable to reflect a first portion of the laser light back through the resonator cavity so as to support the lasing of the gain medium, and to direct a second portion of the laser light in the form of a solid circular beam of laser light having high power and brightness. The reflective elements may be coated with highly reflective materials, including materials that may preferentially reflect light emitted by the second excited state in the laser gain medium in preference to that from either the first excited state or the fiber lasers.

In one preferred exemplary embodiment, a cooling fluid may be circulated through the cavity of the resonator during operation to cool the laser gain medium.

In another exemplary embodiment, a method for combining a plurality of low-power, low-brightness laser beams into a single high-power, high-brightness laser beam comprises providing an annular solid laser gain medium disposed in the cavity of an annular ring resonator, and pumping the gain medium with the low-power, low-brightness laser beams so as to cause the gain medium to lase and thereby produce an axially directed annular beam of high-power, high-brightness laser light. The method may further comprise compacting the annular laser beam into a circular laser beam, dividing the circular laser beam into a feedback portion and an outcoupled portion, and returning the feedback portion to the ring resonator to support the lasing of the laser medium. The method may further include circulating a fluid over a surface of the laser gain medium during operation to cool it.

A better understanding of the above and many other features and advantages of the novel high-power, high-brightness laser beam combiner of the present invention may be obtained from a consideration of the detailed description below of some exemplary embodiments thereof, particularly if such consideration is made in conjunction with the appended drawings, wherein like reference numerals are used to identify like elements illustrated in one or more of the figures thereof.

DETAILED DESCRIPTION

In accordance with the exemplary embodiments described herein, a laser beam combiner provides a compact, light weight and efficient laser for a variety of laser applications, including weapons applications. The laser beam combiner of the invention utilizes an annular, solid gain medium disposed in the cavity of an annular laser ring resonator and pumped by a plurality of un-phased, relatively low-brightness fiber laser beams (e.g., of the type used in fiber welding lasers) to produce a single, high-power, high-brightness output beam that provides higher, weapon-level performance with lower weight, size and cost.

Figure 1:
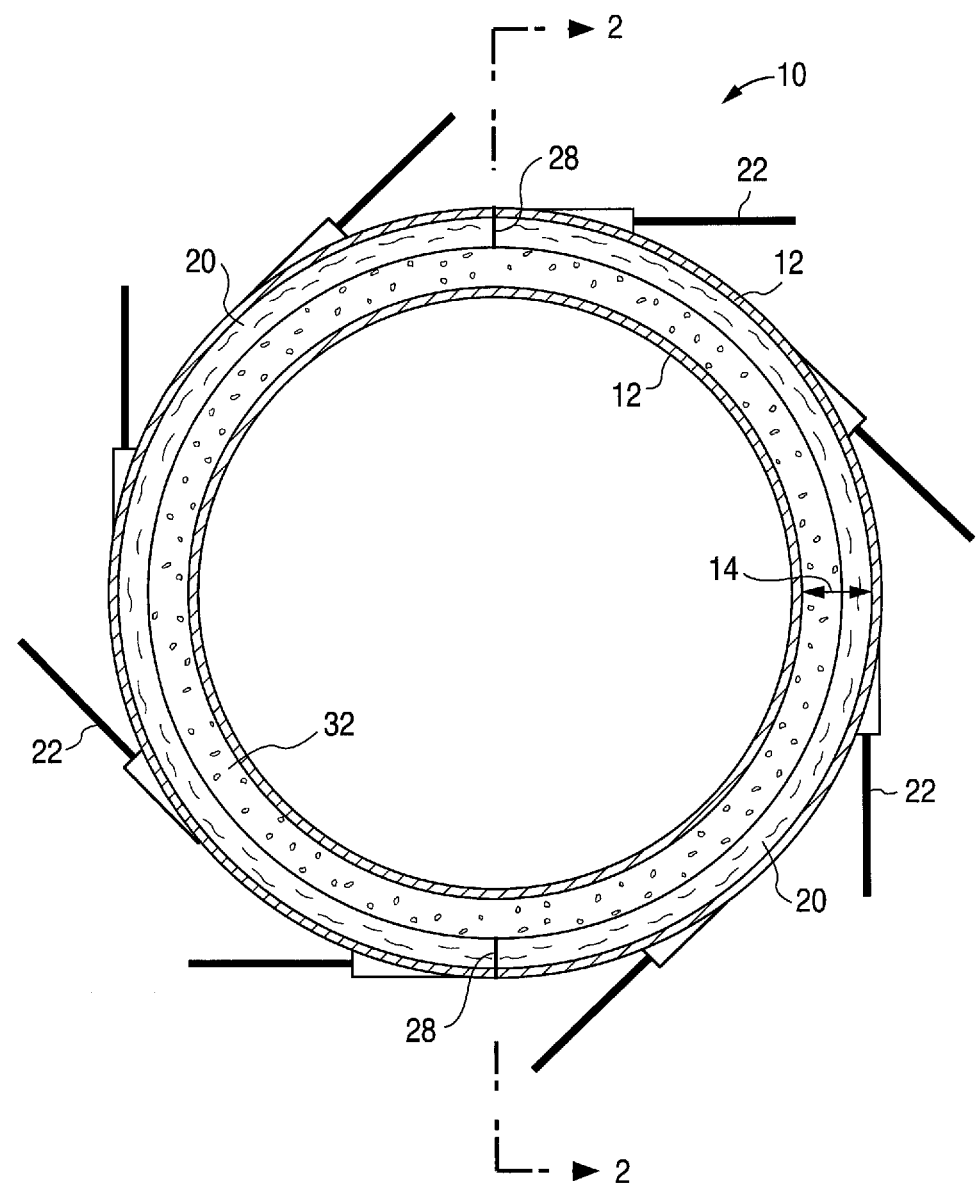
FIG. 1 is a partial cross-sectional end view of an exemplary embodiment of a fiber laser beam combiner in accordance with the present invention.
Figure 2:
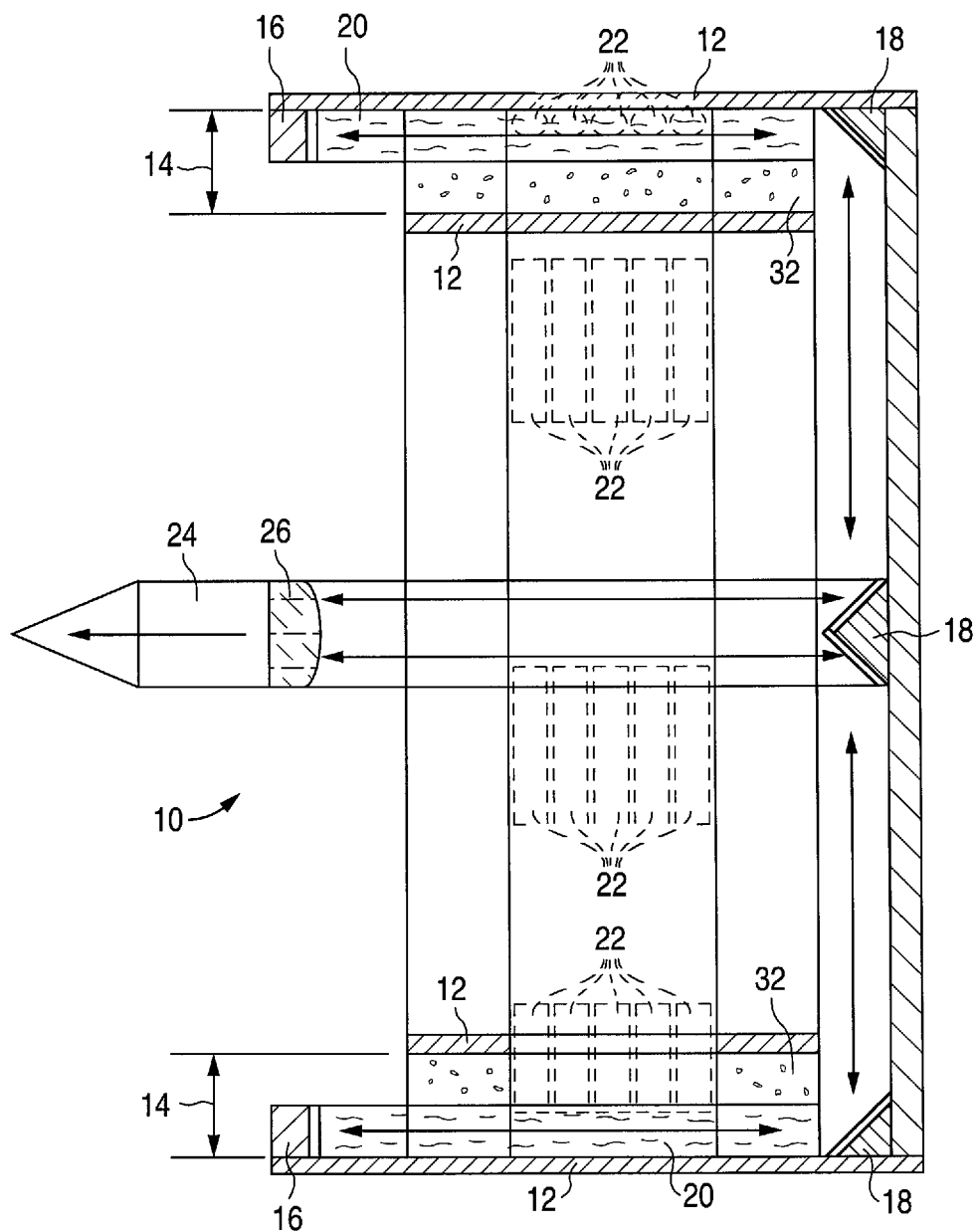
FIG. 2 is a partial cross-sectional view of the exemplary fiber laser beam combiner of FIG. 1, as seen along the lines of the section 2-2 taken therein.

FIG. 1 is partial cross-sectional end view of a first exemplary embodiment of a fiber laser beam combiner 10 in accordance with the present invention, and FIG. 2 is a partial cross-sectional view of the exemplary fiber laser beam combiner of FIG. 1, as seen along the lines of the section 2-2 taken therein.

Figure 3:
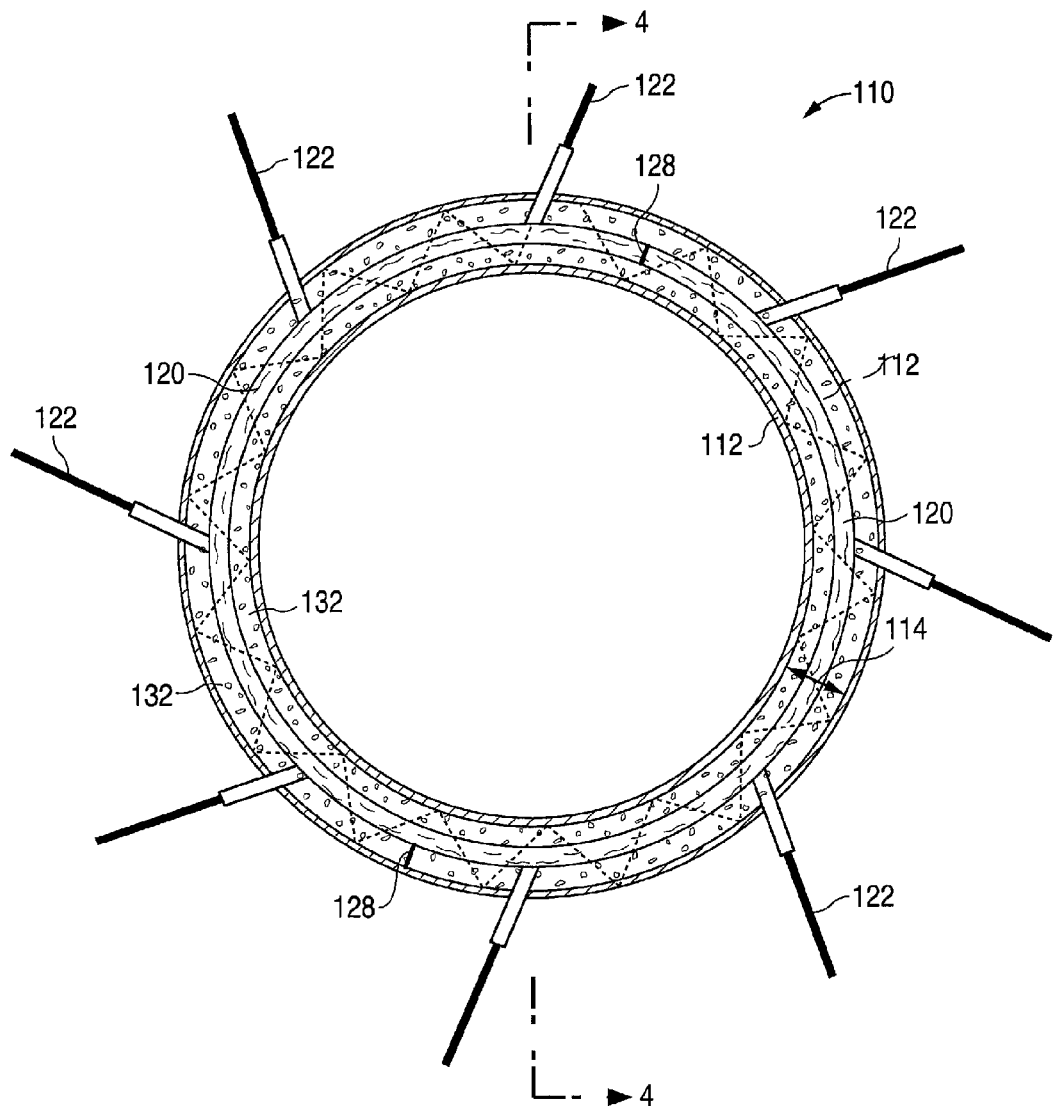
FIG. 3 is a partial cross-sectional end view of another exemplary embodiment of a fiber laser beam combiner in accordance with the present invention; and, FIG. 4 is a partial cross-sectional view of the exemplary fiber laser beam combiner of FIG. 3, as seen along the lines of the section 4-4 taken therein.
Figure 4:
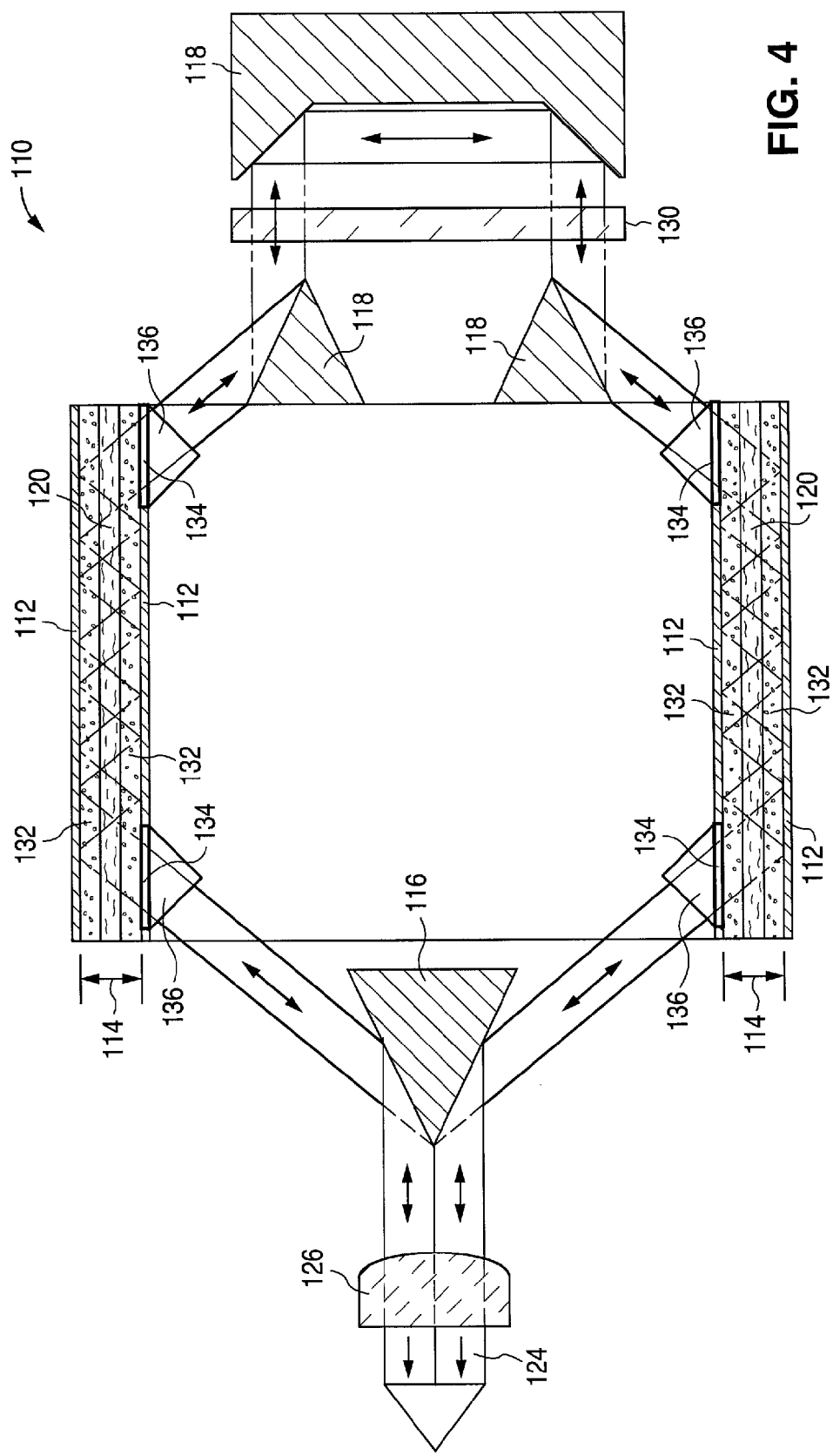

FIG. 3 is a partial cross-sectional end view of a second exemplary embodiment 110 of a fiber laser beam combiner in accordance with the present invention, and FIG. 4 is a partial cross-sectional view of the second laser beam combiner of FIG. 3, as seen along the lines of the section 4-4 taken therein. As discussed in more detail below, the second exemplary beam combiner is very similar to the first embodiment, except for the optical elements and cooling techniques employed therein, and accordingly, the reference numerals of elements that are the same or similar to those of the first embodiment are obtained for the second embodiment by adding 100 to those of the first embodiment.

As illustrated in FIGS. 1 and 2, the first exemplary laser beam combiner 10 comprises a pair of concentric annular shells 12 defining an annular cavity 14 having a long axis, reflective or refractive annular interior wall surfaces, and reflective optical elements 16, 18 and 20 disposed at opposite ends thereof (see FIG. 2) so as to define an "annular ring resonator," of the types described in, e.g., U.S. Pat. No. 4,598,408 to J. O'Keefe; U.S. Pat. No. 4,606,036 to D. Holmes; U.S. Pat. No. 4,744,090 to R. Freiberg; and, U.S. Pat. No. 6,282,225 to D. Bullock et al.

As illustrated in FIGS. 1 and 2, a solid, or "monolithic," annular laser gain medium 20 comprising, for example, crystalline Yttrium Aluminum Garnet (YAG) appropriately doped with an impurity, such as Neodymium (Nd), Ytterbium (Yb), Erbium (Er) or Thulium (Tm) is disposed in the annular cavity 14 of the resonator. The annulus of the resonator cavity also provides locations for the injection of the respective laser beams of a plurality of fiber lasers 22. The respective output ends of the fiber lasers 22 are coupled into the annular resonator cavity 14 and operable to inject respective beams of laser light into the cavity. The respective laser beams of the fiber lasers 22 are directed around the annulus of the cavity due to a reflective surface, or alternatively, to the relative indices of refraction, of the gain medium 20 and the surrounding materials of the shells 12 of the cavity, to produce total internal reflection (TIR) within the cavity, so as to effect a population inversion in the gain medium and thereby cause the gain medium to lase and produce an axially directed annular beam of laser light, as indicated by the arrows in the figures.

The fiber lasers 22 may be relatively low power and brightness devices and comprise, e.g., an elongated glass fiber having one or more laser diodes (not illustrated) optically coupled to an input end thereof. The fiber laser may also incorporate features that cause the emitted laser beam to be emitted at a desired wavelength, such as a fiber grating or an external Raman cell (not illustrated). Depending on the nature of the lasing medium 20 and the injected laser fiber beams, the fiber laser beams may be shaped to provide more efficient laser operation. For example, the cross-sectional shape of the individual fiber laser beams may be expanded into the shape of an ellipse, with the long axis thereof oriented parallel to the long axis of the resonator cavity 14 and the extracted laser beam, thereby facilitating efficient adsorption in the thin, annular lasing medium 20. This approach provides an adequate path length for efficient adsorption of the injected fiber laser beams.

As illustrated in FIGS. 1 and 2, the beams of the fiber lasers 22 may be introduced at a relatively large number of axial and circumferential locations, and are distributed both circumferentially and axially in a way that produces a uniform pumping of the gain medium 20. Where space within the lumen of the resonator permits, such as in the second exemplary embodiment 110 illustrated in FIGS. 3 and 4, the input ends of the fiber lasers 22 can also be coupled into the resonator cavity 14 through the wall of the interior shell 12 of the laser beam combiner. In the particular embodiments illustrated in the figures, each fiber laser beam propagates through the gain medium, as well as one or more layers of a coolant fluid, described in more detail below. The wavelength of the fiber laser beams and the level of doping of the annular laser gain medium 20 combine to produce a suitable length for adsorption of the fiber laser beams so as to produce a nearly uniform pumping of the gain medium.

Of importance, since the fiber lasers 22 are used only to excite the annular lasing medium 20, the fiber laser beams do not have to be either of high brightness or phase matched. The beams may be injected directly into the annular gain medium 20, or alternatively, may pass through a set of shaping optics (not illustrated) that suitably shape the cross-sectional profile of the beam, as described above, so as to facilitate a more uniform adsorption of the laser light.

The wavelength of the fiber lasers 22 is selected such as to provide for efficient and uniform coupling of the energy of the fiber laser beams into the excitation of the doping material in the annular gain medium 20 and to produce a first excited state therein. For example, a fiber laser may utilize laser diodes to excite $Er^{3+}$ and to produce a fiber laser beam 22 at a wavelength of approximately 1550 nm. Both the dopant or dopants in the annular gain medium 20 and their concentration may be selected to achieve efficient and uniform production of a first excited state in the annular gain medium. For example, the annular gain medium 20 may contain 0.2% Er dopants, which adsorbs the fiber laser beams by excitation of $Er^{3+}$ ions from the $^4I_{15/2}$ state to the first excited state which is one of the Stark level of the $^4I_{13/2}$ state. This excited state produces a second excited state in the annular gain medium 20 that is able to produce a laser beam 24 with a wavelength of approximately 1640 nm by transition to a lower energy state. This second excited state is a lower energy Stark level of the $^4I_{13/2}$ state of $Er^{3+}$. The energy of the fiber laser beams 22 photons adsorbed in the annular gain medium 20 is only slightly higher than that of the photons produced in the laser beam 24, so little residual energy is left behind in the annular gain medium 22 as a result of the processes leading to the generation of the laser beam 24. This minimizes or potentially eliminates the need for cooling of the gain medium and permits the laser to be operated at a high power level without unacceptable distortion of the laser beam and loss of brightness due to the optical properties of the gain medium.

Under selected conditions, the transfer of energy between a first excited state and a second excited state in the annular gain medium 22 may not be required to achieve the benefits of this invention. This reduces the residual energy that is left in the annular gain medium 22 in the form of heat, that must be removed by cooling. However, this restricts the choice of the medium and dopant in both the fiber lasers 20 and the annular gain medium 22. In general, this also requires that the intensities of the fiber lasers 22 be extremely high so as to produce the first excited state in sufficient numbers as to support the lasing process from the annular gain medium 22.

As discussed above, the prior art approach to combining fiber lasers has generally been electro-optical, in which multiple beams are phase-matched to each other and then geometrically combined into a single, high-brightness beam. In contrast, the exemplary laser beam combiners 10 and 110 of the present invention utilize the diode pumped fiber laser beams to generate a tailored medium in which lasing is relatively efficient and intrinsically of high-brightness, and advantageously, without the need to match the phase of the individual fiber laser 22 beams to each other.

As illustrated in FIG. 2, the annular ring resonator, which may comprise, e.g., a decentered annular ring resonator (DARR) or a half-symmetric unstable resonator with internal axicon (HSURIA), is provided to extract a single, high-brightness laser beam 24 radiating from the gain medium 20 in the direction of the single-headed arrow in the figures. In the particular exemplary embodiments illustrated in FIGS. 2 and 4, the resonator utilizes a Gradient Reflectivity Mirror (GRM) 26, of the type described in, e.g., U.S. Pat. No. 5,943,358 to T. Allik et al., to achieve mode stability, but numerous other approaches are also possible, such as "scraper mirrors," which comprise mirrors having an opening therein that allow a first portion of incident light to pass through the opening and reflect a second portion of the incident light in another direction, e.g., back along the axis of incidence. The central optics of the ring resonator are configured so as to compact the annular laser beam generated by the gain medium 20 into an appropriate form (e.g., a single circular beam 24) for optimum propagation through a beam director (not illustrated) of, e.g. a laser weapon system. Adsorptive materials, e.g., longitudinally extending filters or barriers 28, or other methods may be strategically employed in the beam combiner 10 to prevent parasitic losses through, e.g., amplified spontaneous emission (ASE), if required by the dimensions and loaded gain of the annular lasing medium 20. Additionally, other special features, e.g., tapering, coatings or polarizers 130, such as that illustrated in FIG. 4, may be incorporated in the beam combiner to control mixed polarizations and other degraders of laser power and performance.

As illustrated in FIGS. 2 and 4, the fiber laser 22 beams are injected into the gain medium 20, where they are adsorbed to produce a population inversion of the lasing ion (e.g., Nd, Yb, Er or Tm). The resonator of the combiner then produces a single, coherent, high-brightness laser beam 24 as a result of this population inversion. As discussed below, cooling is provided in the laser beam combiners 10 and 110 to provide a sufficiently uniform temperature within the gain medium that the gain medium produces a high brightness beam and is not excessively impacted by adverse factors, such as birefringence.

In the first exemplary laser beam combiner 10 of FIGS. 1 and 2, the cavity 14 of the ring resonator includes an annular cooling space, or channel 32, formed between the internal wall of the cavity and the internal wall of the annular gain medium 20, and in the second exemplary beam combiner 110, two such annular cooling channels 132 are provided, viz., one between the adjacent respective inner walls of the cavity and the lasing medium, and one between the adjacent respective outer walls thereof. Additionally, means (not illustrated) are provided within or in association with the laser beam combiner 10 or 110 for circulating an optically transparent cooling fluid, such as air, water or heavy water (deuterium oxide) through the cooling channel(s). In one exemplary embodiment, flow through the coolant channels is directed generally in an axial direction. The coolant flows are contained within the interior and/or exterior annular cavity shells 12. Thus, in the exemplary beam combiners 10 and 110 illustrated, robust fluid cooling is provided on one or both of the inner and outer surfaces of the laser gain medium, for example, by forced convection flow, and with or without vaporization of the fluid, to achieve a tightly controlled and safe temperature level in the gain medium.

The concentric annular shells 12 that define the resonator cavity 14 may be either reflecting or transmissive to the beams of the fiber lasers 22. The exterior surfaces of these shells will in general be disposed in either a gas (e.g., air) or a vacuum (e.g., outer space) environment. If the shells are transmissive in nature (e.g., comprising a silica glass), the fiber laser beams are preferably inserted into the resonator cavity at such an angle that the beams are effectively completely contained within the annular region containing the gain medium 20 and the cooling channel(s) by total internal reflection. Total internal reflection occurs due to the large difference in the index of refraction between the silica shells and the gas or vacuum.

Extraction of the main laser beam 24 from the laser beam combiner 10 is accomplished with a set of cylindrical optics, or reflective elements, which uniformly interrogate the gain medium 20. In the first exemplary laser beam combiner 10 of FIG. 2, these elements comprise a toric reflector 16 and the axially disposed GRM 26 described above, located at the front end of the resonator cavity 14, and a cylindrical "axicon" 18 disposed at the rear end thereof. An axicon is simply a circular reflective element having a conically shaped reflecting surface disposed concentric to a central axis thereof. An axicon comprising two concentric conical reflectors and having a W-shaped cross-section is referred to as a "waxicon," and an axicon having two concentric conical reflectors in which the central conical reflector is reversed relative to that of a waxicon is referred to as a "reflaxicon." Thus, the reflective element 18 disposed at the rear of the resonator cavity of the first embodiment of FIG. 2 comprises a waxicon.

In the second exemplary laser beam combiner 110 of FIG. 4, the reflective elements comprise an axicon 116 and the GRM 126 described above disposed on the central axis of the resonator at the front end thereof, and a pair of concentric axicons 118 disposed at the rear end thereof. The laser beam combiner 110 of FIG. 4 further differs from the embodiment 10 of FIG. 2 in that the inner shell 132 of the resonator includes a pair of transparent internal circumferential windows 134, each disposed adjacent to a respective end of the resonator cavity, and a pair of annular or toric prisms 136 disposed in the resonator cavity 114 and arranged so as to intercept the annular laser beam passing through the cavity and refract it in the direction of the arrows toward a respective one of the axicons 116 and 118 respectively located at the front and rear ends thereof.

In both exemplary laser beam combiners 10 and 110, the optical elements, including the axicons, prisms and mirrors, serve to circulate the annular laser beam through the gain medium 20 or 120 one or more times. The annular beam is then compacted at the output end of the combiner into a circular beam with little or no central obscuration. This beam, in turn, is divided by the GRM 26 or 126 into a "feedback" portion and an "extracted," or out-coupled portion 24 or 124, as illustrated in FIGS. 2 and 4, respectively. The feedback portion is returned to the ring resonator to support lasing of the laser gain medium 20 or 120. Thus, in the figures, the double-headed arrows indicate paths in which the laser light travels in both directions, whereas, the single-headed arrow indicates the path taken by the unidirectional, out-coupled portion of light.

In the particular exemplary embodiments illustrated, the feedback and extracted beams are created using a GRM 26 or 126, although as discussed above, other approaches are possible. The feedback beam, after its passage through the gain medium 20 or 120, is redirected and inverted, and then sent back through the gain medium again. Where the annular beam passes through the resonator cavity a multiple number of times, other optical elements, e.g., special coatings on the reflective surfaces, or the polarizer element 130 illustrated in FIG. 4, may be utilized in addition to the axicon elements for, e.g., polarization control.

The fiber laser beam combiners 10 and 110 disclosed herein have a high efficiency (i.e., high electrical-to-laser-beam energy efficiency), since they use fiber lasers 22 to produce monochromatic but multi-mode light at high efficiency. As discussed above, fiber lasers typically have a far higher efficiency than slab-type lasers. Accordingly, the configurations disclosed enable highly efficient utilization of these fiber laser beams to pump the gain medium 20 or 120. As further discussed above, optical approaches to fiber laser beam combining generally encounter substantial losses in brightness due to the limitations in phasing dozens or even hundreds of beams, whereas, the laser beam combiners 10 and 110 described above can convert the pumped medium to a high-brightness beam with high efficiency and relatively little optical loss.

The exemplary embodiments disclosed herein are also well adapted to operation with dopants, such as Erbium (Er), that lase at an eye-safe wavelength (e.g., a wavelength greater than 1.3 microns.) This is a particular benefit when considering operation of an air-to-ground laser weapon system, which has the potential of producing blindness in individuals near the point of impact of the laser beam.

Additionally, the overall system of the present invention is compact and readily packaged in aircraft or other delivery platforms. The fiber lasers 22 may be located remotely from the annular ring resonator "head," and the fiber laser beams may be routed without consideration of degradation in beam quality. The laser head is inherently highly compact, with a 100 kW-class laser head being less than about 1 m³ in volume.

Fabrication of the laser beam combiners of the present invention is inherently simple. For example, the annular laser gain medium 20, 120 may be ceramic, which is amenable to routine production by automated systems. The gain medium may comprise an assembly of multiple parts, making it simple to fabricate without resorting to extremely large crystal or ceramic fabrication equipment. The instant laser beam combiners also minimize thermal loading of the gain medium, which reduces the complexity of the cooling required for the laser.

By now, those of skill in this art will appreciate that many modifications, substitutions and variations can be made in and to the materials, methods and implementation of the high power and brightness laser beam combiner of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A laser beam combiner, comprising:
    a pair of concentric annular shells defining an annular cavity having a long axis, annular interior wall surfaces and reflective elements disposed at opposite ends thereof so as to define an annular ring resonator;
    an annular solid laser gain medium disposed in the cavity of the resonator; and,
    a plurality of fiber lasers having output ends coupled into the cavity of the resonator and operable to output respective beams of laser light into the cavity so as to effect a population inversion in the gain medium and thereby cause the gain medium to lase and produce an axially directed annular beam of laser light,
    wherein at least one of the reflective elements of the resonator is operable to reflect a first portion of the laser light back through the resonator cavity and to couple off a second portion of the laser light in the form of a circular beam of laser light.

2. The laser bean combiner of claim 1, wherein the at least one reflective element comprises a gradient reflectivity mirror (GRM).

3. The laser beam combiner of claim 1, wherein at least one of the reflective elements comprises an axicon.

4. The laser beam combiner of claim 3, wherein the axicon comprises a waxicon or a reflaxicon.

5. The laser beam combiner of claim 1, wherein at least one of the reflective elements comprises a toric reflector.

6. The laser bean combiner of claim 1, further comprising a toric prism disposed in the cavity adjacent to one of the ends thereof.

7. The laser beam combiner of claim 1, wherein the annular solid laser gain medium comprises crystalline Yttrium Aluminum Garnet (YAG) doped with an impurity.

8. The laser beam combiner of claim 7, wherein the impurity comprises Erbium (Er).

9. The laser beam combiner of claim 1, wherein the resonator comprises a de-centered annular ring resonator (DARR) or a half-symmetric unstable resonator with internal axicon (HSURIA).

10. The laser beam combiner of claim 1, wherein the cavity of the resonator includes at least one annular cooling channel formed between a wall of the cavity and a wall of the annular gain medium, and further comprising apparatus for circulating a cooling fluid through the cooling channel.

11. The laser beam combiner of claim 10, wherein the cooling fluid comprises air, water or heavy water.

12. The laser beam combiner of claim 1, further comprising apparatus for shaping the cross-sectional shape of the respective laser beams of the fiber lasers.

13. The laser beam combiner of claim 1, further comprising apparatus for preventing amplified spontaneous emission (ASE) of the laser medium.

14. The laser beam combiner of claim 1, further comprising a polarizing element disposed in the combiner for controlling the polarization of the light passing therethrough.

15. The laser beam combiner of claim 1, wherein each fiber laser comprises an elongated glass fiber having a laser diode coupled to an input end thereof.

16. The laser beam combiner of claim 1, wherein the output ends of the fiber lasers and the interior walls of the resonator cavity are arranged and configured such that the walls of the cavity reflect or refract substantially all of the fiber laser light beams incident thereon back into the resonator cavity.

17. A method for combining a plurality of laser beams into a single laser beam utilizing the laser beam combiner of claim 1, the method comprising:
    pumping the gain medium with the plurality of laser beams so as to cause the gain medium to lase and thereby produce an axially directed annular beam of laser light.

18. The method of claim 17, further comprising;
    compacting the annular laser beam into a circular laser beam;
    dividing the circular laser beam into a feedback portion and an out-coupled portion; and,
    returning the feedback portion to the ring resonator to support the lasing of the laser medium.

19. The method of claim 17, further comprising shaping one or more of the plurality of laser beams.

20. The method of claim 17, further comprising circulating a fluid over a surface of the laser gain medium to cool it.

21. A fiber laser beam combiner system, comprising the laser beam combiner of claim 1 and a plurality of location therein for the injection of a plurality of fiber laser beams into the gain medium.

22. The system of claim 21, wherein the lasing medium comprises Yttrium Aluminum Garnet (YAG) doped with Neodymium or Ytterbium.

23. The system of claim 21, wherein cooling is provided on at least one of inner and outer cylindrical surfaces of the laser gain medium.

24. The system of claim 21, further comprising apparatus for preventing parasitic losses of the system through amplified spontaneous emission (ASE).

* * * * *